Jan. 26, 1965    K. KATZ    3,167,482
FUEL ELEMENT
Filed May 11, 1962
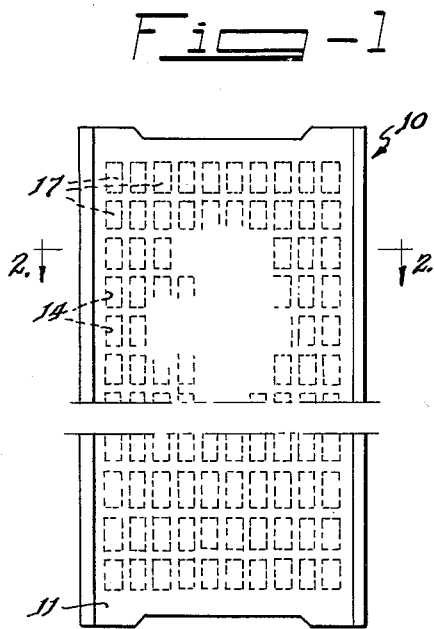
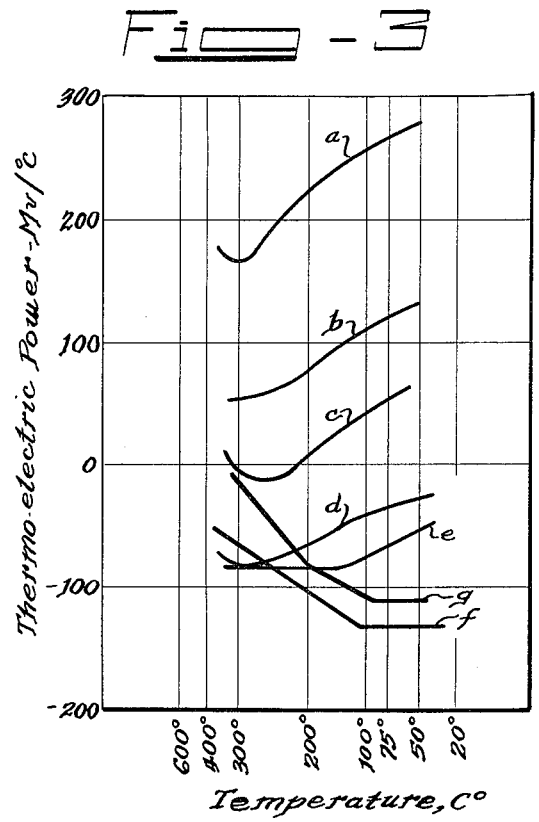
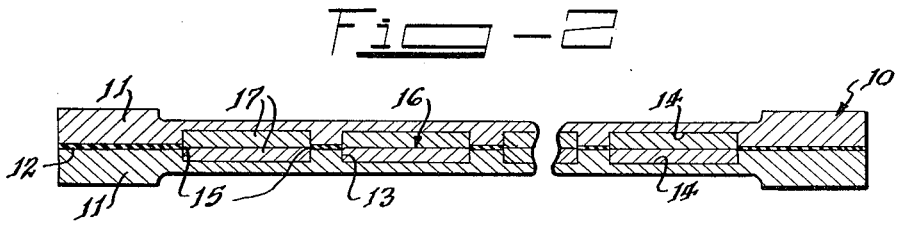
INVENTOR.
Kurt Katz
BY
Attorney 3,167,482
FUEL ELEMENT
Kurt Katz, Pittsburgh, Pa., assignor, by mesne assignments, to the United States of America as represented by the United States Atomic Energy Commission
Filed May 11, 1962, Ser. No. 194,206
2 Claims. (Cl. 176—68)

This invention relates to a fuel element for a nuclear reactor which is capable of converting fission heat directly to electrical energy. In more detail the invention relates to a fuel element wherein the nuclear fuel is a semiconductor material which generates thermoelectric power as well as nuclear power from the fission heat generated in the fuel element.

It is well known that an electromotive force is produced when two dissimilar materials are joined to form an electrical circuit and one junction is heated. A nuclear reactor which develops thermoelectric power by utilizing the above-described phenomena is described in Patent No. 2,902,423 dated September 1, 1959. According to this patent fuel elements are sandwiched between constantan and Chromel thermoelectric elements to form the hot junctions of a thermopile. An electromotive force is generated in circuits including these thermocouples when the reactor is in operation.

It is an object of the present invention to develop a fuel element for a nuclear reactor which is capable of directly converting fission heat to electrical energy.

It is another object of the present invention to develop a fuel element for a nuclear reactor which employs fissionable material as thermal elements for the production of thermoelectricity.

These and other objects of the present invention are attained in a fuel element composed of a plurality of thermoelectric junctions formed of semiconductor fissionable materials having Seebeck coefficients of opposite sign. Uranium oxides having slightly different oxygen content are used as the semiconductor materials. The uranium oxides constitute the fissionable fuel for the reactor as well as the hot junction thermomaterial.

It has been found that some uranium oxides have an excess of electrons and therefore have a negative Seebeck coefficient (thermoelectric power) whereas other uranium oxides have an excess of positive carriers (holes) and therefore have a positive Seebeck coefficient. Materials having a negative Seebeck coefficient are known as n-type semiconductors while materials having a positive Seebeck coefficient are known as p-type semiconductors. The terminology used is that conventionally used in semiconductor theory.

The invention will next be described in connection with the accompanying drawing wherein:

FIG. 1 is a plan view of a fuel element according to the present invention,

FIG. 2 is a cross-sectional view taken in the direction of the arrows 2—2 in FIG. 1 and FIG. 3 is a graph showing the thermoelectric power of several uranium oxides.

Referring now to the drawing a fuel element 10 for a nuclear reactor comprises a pair of elongated, flat, metal plates 11, such as zirconium or stainless steel, separated by a thin mica sheet 12. Plates 11 and mica sheet 12 are cemented together or are held together by insulated rivets. Fuel element 10 contains a plurality of compartments 13 formed of aligned pockets 14 on the inside of plates 11 and openings 15 in mica sheet 12. Thermoelectric junctions 16, consisting of a pair of uranium oxide wafers 17 which are in contact, are disposed in compartments 13. One wafer 17 is formed of an n-type uranium oxide while the other wafer 17 is formed of a p-type uranium oxide. Each wafer 17 is in contact with only one of the metal plates 11.

Reference will now be made to FIG. 3 wherein curve $a$ refers to $UO_{2.032}$, curve $b$ refers to $UO_{2.074}$, curve $c$ refers to $UO_{2.160}$, curve $d$ refers to $UO_{2.208}$, curve $e$ refers to $UO_{2.264}$, curve $f$ refers to $UO_{2.317}$ and curve $g$ refers to $UO_{2.353}$. It is at once apparent from an inspection of the graph that curves $a$ and $b$, and curve $c$, over most of its extent, are on the positive side of the graph, the graph showing a positive thermoelectric power for these oxides. The remaining curves show a negative thermoelectric power for these oxides. When an n-type semiconductor is placed in contact with a p-type semiconductor and the junction is heated, completion of a circuit results in an electromotive force being produced. Therefore thermoelectric power can be obtained from an n-p junction of uranium oxides. As shown by the graph the p-type oxide can have a formula between approximately $UO_{2.00}$ and $UO_{2.16}$ whereas the n-type oxide can have a formula between about $UO_{2.2}$ and $UO_{2.35}$.

It will be appreciated that a large number of junctions will be required to obtain an appreciable thermoelectric power in a reactor. While the size of the fuel wafers forming the junctions and the number in a fuel element can be varied, the disclosed fuel element employs wafers which are 1" x ½" x ⅛" arranged in a 10 x 25 lattice in a fuel element which is 30" long by 7" wide by 0.3" thick. The n-side of one fuel element is placed adjacent and contacting the n-side of the next fuel element and the p-sides are placed in contact. All of the junctions in two adjacent fuel elements are therefore in parallel and the pairs of fuel elements can then be connected in series in a circuit from which useful power can be derived. Fuel elements of this type can be employed in a gas-cooled reactor or one cooled with high resistivity water.

The desired oxides are prepared by exposing 325-mesh $UO_2$ powder to dry oxygen at 180° C. for the time necessary to prepare an oxide having the desired oxygen content. The wafers are then prepared by hydrostatic pressure.

It will be understood that the invention is not to be limited to the details given herein but that it may be modified within the scope of the appended claims.

What is claimed is:

1. A fuel element for a nuclear reactor comprising a pair of elongated, flat, metal plates separated by an electrically insulating sheet of mica, said fuel element containing a regular array of compartments, each compartment consisting of aligned pockets on the inside of the metal plates and an opening in the mica sheet therein, and thermoelectric junctions consisting of a pair of contacting wafers of uranium oxides of different oxygen content, disposed in said compartments with each of the wafers contacting only one plate, the uranium oxide of one wafer being an n-type semiconductor and the uranium oxide of the other wafer being a p-type semiconductor.

2. A fuel element according to claim 1 wherein one of said oxides contains oxygen in a proportion of between 2 and 2.16 parts of oxygen to one part of uranium and the other oxide contains oxygen in a proportion of between 2.2 and 2.35 parts of oxygen to one of uranium.

References Cited by the Examiner
UNITED STATES PATENTS

| | | | |
|---|---|---|---|
| 2,902,423 | 9/59 | Luebke et al. | 176—12 |
| 3,005,766 | 10/61 | Bartnoff | 136—4 |
| 3,008,890 | 11/61 | Bartnoff | 136—4 |

OTHER REFERENCES

AEC Report WAPD–PWR–PMM–904, December 3, 1956, pp. 73–75.

AEC Report TID–7546, Book 2, November 1957, pp. 484 and 485.

Nucleonics, vol. 17, No. 7, July 1959, p. 51.

CARL D. QUARFORTH, *Primary Examiner.*

REUBEN EPSTEIN, OSCAR R. VERTIZ, *Examiners.*